(12) United States Patent
Bybee et al.

(10) Patent No.: US 10,157,497 B2
(45) Date of Patent: Dec. 18, 2018

(54) TEXTURED DIGITAL ELEVATION MODEL GENERATION

(71) Applicant: Utah State University Research Foundation, Logan, UT (US)

(72) Inventors: Taylor C. Bybee, Soda Springs, ID (US); Scott E. Budge, Logan, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 15/493,552

(22) Filed: Apr. 21, 2017

(65) Prior Publication Data

US 2017/0309066 A1 Oct. 26, 2017

Related U.S. Application Data

(60) Provisional application No. 62/326,158, filed on Apr. 22, 2016.

(51) Int. Cl.

| G06T 17/05 | (2011.01) |
| G06T 7/80 | (2017.01) |
| G06T 7/33 | (2017.01) |
| G06T 15/04 | (2011.01) |
| G01S 17/88 | (2006.01) |

(52) U.S. Cl.
CPC .............. *G06T 17/05* (2013.01); *G06T 7/337* (2017.01); *G06T 7/80* (2017.01); *G06T 15/04* (2013.01); *G06T 2207/10028* (2013.01); *G06T 2207/10032* (2013.01)

(58) Field of Classification Search
None
See application file for complete search history.

(56) References Cited

U.S. PATENT DOCUMENTS

| 7,363,157 B1* | 4/2008 | Hanna | G01C 11/00 702/5 |
| 2003/0030582 A1* | 2/2003 | Vickers | G01S 17/023 342/54 |
| 2004/0130702 A1* | 7/2004 | Jupp | G01S 7/497 356/5.01 |

OTHER PUBLICATIONS

Bybee, An Automatic Algorithm for Textured Digital Elevation Model Formation using Aerial Texel Swaths, All Graduate Theses and Dissertations, DigitalCommons@USU Paper 4593, pp. 1-91 (2016).

(Continued)

*Primary Examiner* — Said Broome

(57) ABSTRACT

For textured digital elevation model generation, a method projects swath point projection coordinates of each lidar point of texel swaths into a corresponding texel swath with normalized projection coordinates. Each texel swath includes lidar points, an optical image, and swath output projection point coordinates of the lidar points into the optical image. The method generates a projection matrix including lidar point data for each lidar point of each texel swath. The method calculates enhanced lidar coordinates for each lidar point as a function of minimizing misregistration errors. In addition, the method creates enhanced output pixel coordinates for each image pixel based on the enhanced lidar coordinates for the lidar points and the associated output pixel coordinates. The method generates a textured digital elevation model based on the enhanced output pixel coordinates for each image pixel, and the enhanced lidar coordinates.

20 Claims, 14 Drawing Sheets

(56) References Cited

OTHER PUBLICATIONS

Bybee et al., Textured digital elevation model formation from low-cost UAV ladar/digital image data, Electrical and Computer Engineering Faculty Publications, DigitalCommons@USU Paper 131, pp. 1-12 (2015).

Killpack et al., Dynamic visualization of three-dimensional Images from multiple texel images created from fused ladar/digital imagery, 56:3 Optical Engineering 031209-1-031209-10 (Mar. 2017).

Killpack, Visualization of Three-Dimensional Models from Multiple Texel Images Created from Fused Ladar/Digital Imagery, All Graduate Theses and Dissertations, DigitalCommons@USU Paper 4637 pp. 1-59 (2015).

* cited by examiner

255

| Lidar Point Index 465 |
|---|
| Lidar Point Coordinates 455 |
| Swath Point Projection Coordinates 453 |
| Swath Output Point Projection Coordinates 457 |
| Swath Pixel Coordinates 460 |
| Output Point Projection Coordinates 462 |
| Output Lidar Point Coordinates 463 |
| Enhanced Lidar Coordinates 270 |
| Enhanced Output Point Projection Coordinates 472 |
| Normalized Projection Coordinates 155 |
| Calibrated Projection Coordinates 159 |
| Calibrated Projection Error 275 |
| Matching Projection Error 280 |
| Range Error 288 |
| Range Measurement 290 |

TEXTURED DIGITAL ELEVATION MODEL GENERATION

CROSS-REFERENCE TO RELATED APPLICATIONS

This application claims priority to U.S. Provisional Patent Application No. 62/326,158 entitled "TEXTURED DIGITAL ELEVATION MODEL FORMATION" and filed on Apr. 22, 2016 for Taylor C. Bybee, which is incorporated herein by reference.

BACKGROUND

Field

The subject matter disclosed herein relates to textured digital elevation model generation.

Description of the Related Art

Lidar sensors and optical sensors may collect elevation data in multiple swaths.

BRIEF SUMMARY

A method for textured digital elevation model generation is disclosed. The method projects swath point projection coordinates of each lidar point of texel swaths into a corresponding texel swath with normalized projection coordinates. Each texel swath comprises lidar points, an optical image, and swath output projection point coordinates of the lidar points into the optical image. The method generates a projection matrix comprising lidar point data for each lidar point of each texel swath. The lidar point data comprises the normalized projection coordinates. The method calculates enhanced lidar coordinates for each lidar point as a function of minimizing misregistration errors. In addition, the method creates enhanced output pixel coordinates for each image pixel based on the enhanced lidar coordinates for the lidar points and the associated output pixel coordinates. The method generates a textured digital elevation model based on the enhanced output pixel coordinates for each image pixel, and the enhanced lidar coordinates. An apparatus and program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3C is a schematic block diagram illustrating one embodiment of lidar point data;

DETAILED DESCRIPTION OF THE INVENTION

Figure 1:
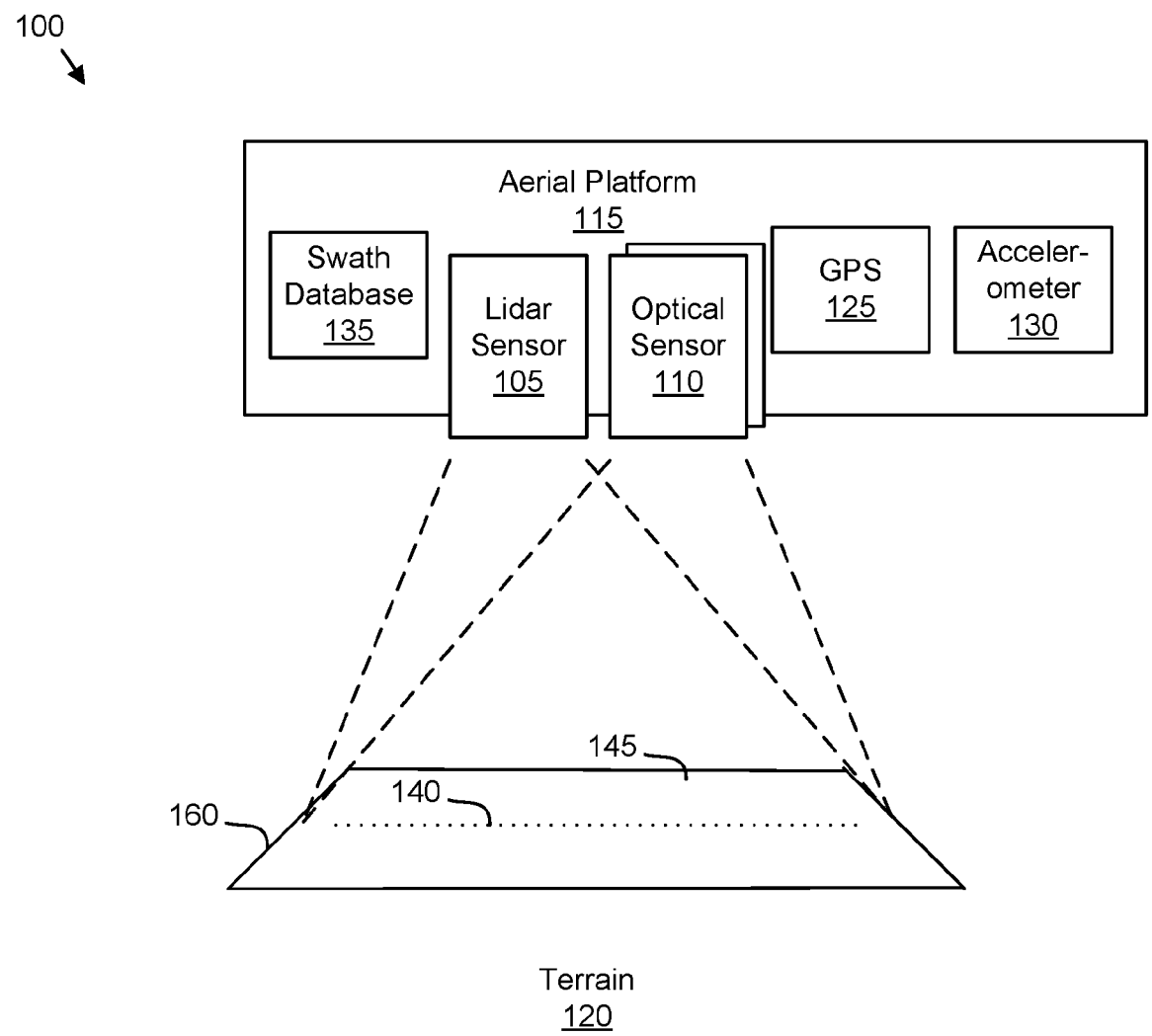
FIG. 1 is a schematic drawing illustrating one embodiment of a texel swath capture system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object-oriented programming language such as Python, Ruby, Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Bybee, Taylor C., and Budge, Scott E., "Textured Digital Elevation Model Formation from Low-cost UAV Lidar/Digital Image Data;" and Bybee, Taylor, "An Automatic Algorithm for Textured Digital Elevation Model Formation Using Aerial Texel Swaths" are incorporated herein by reference.

The description of elements in each figure may refer to elements of proceeding figures. Like numbers refer to like elements in all figures, including alternate embodiments of like elements.

FIG. 1 is a schematic drawing illustrating one embodiment of a texel swath capture system 100. The system 100 may capture texel swaths 160 of a physical terrain 120. The texel swaths 160 are used to generate a textured digital elevation model. In the depicted embodiment, the system includes an aerial platform 115. The aerial platform 115 may be an autonomous vehicle, a drone, an aircraft, and the like.

A lidar sensor 105 and one or more optical sensor 110 may be mounted on the aerial platform 115. The lidar sensor 105 may capture a plurality of lidar points 140 for a texel swath 160. Each optical sensor 110 may capture an optical image 145 for the texel swath 160. The one or more optical sensors 110 may include a visible spectrum optical sensor 110, an infrared optical sensor 110, and the like. The combination of the lidar points 140 and the one or more optical images 145 form the texel swath 160. The lidar points 140 and the optical images 145 may be stored on a swath database 135.

In one embodiment, the system 100 includes a Global Positioning System (GPS) 125, a gyroscope, and/or an accelerometer 130. The GPS 125 and accelerometer 130 may generate pose values that specifies the position and attitude of the lidar sensor 105 and the optical sensor 110.

The texel swaths 160 may be captured from different altitudes. In addition, image points 310 within the texel swaths 160 may be captured from different sensor attitudes. Furthermore, the paths of the aerial platform 115 for each of the texel swaths 160 may not be parallel. The pose values for the texel swaths may also include measurement errors.

The embodiments described herein generate a textured digital elevation model by calculating enhanced lidar coordinates for each lidar point 140 as a function of minimizing misregistration errors, creating enhanced output pixel coordinates of each pixel of the optical image 145 based on the enhanced lidar coordinates for the lidar points 140 and associated output pixel coordinates, and generating the textured digital elevation model based on the enhanced output pixel coordinates and enhanced lidar coordinates as will be described hereafter.

Figure 2A:
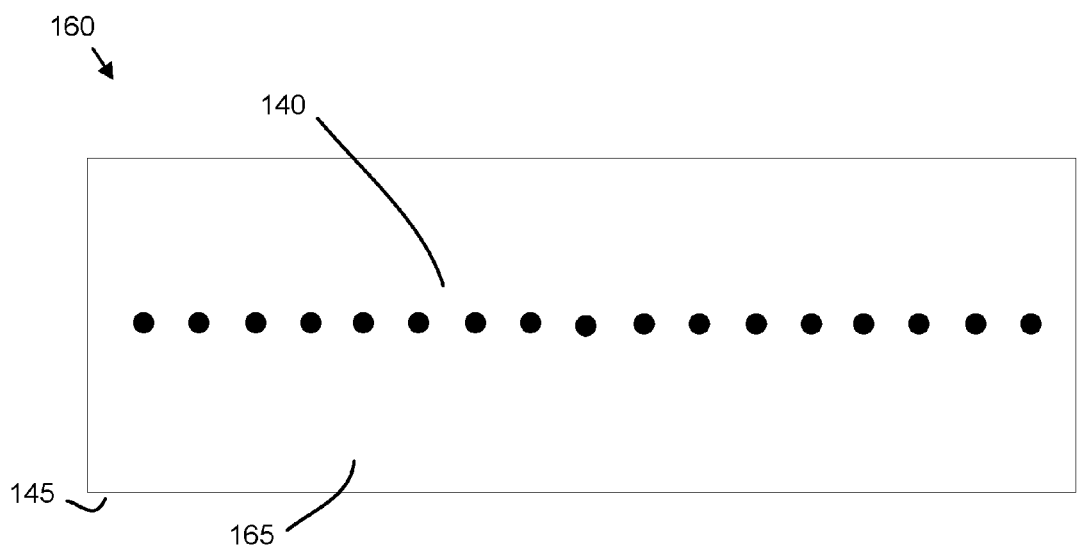
FIG. 2A is a schematic drawing illustrating one embodiment of a Texel swath.

FIG. 2A is a schematic drawing illustrating one embodiment of the texel swath 160. The texel swath 160 includes one or more lidar points 140. The lidar points 140 may be fused with the optical image 145. For simplicity, the embodiments will be described for the case of a single optical image 145. However, the embodiments may be performed for each of the one or more optical images 145. The optical image 145 may include a plurality of image pixels 165. In one embodiment, each lidar point 140 is fused to a corresponding optical image 145 at a calibrated pixel location.

Figure 2B:
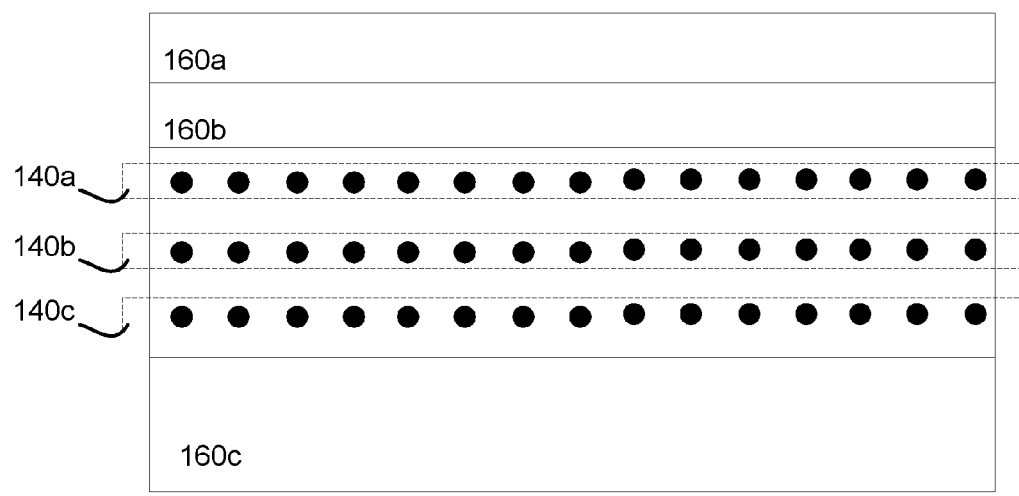
FIG. 2B is a schematic drawing illustrating one embodiment of overlapping texel swaths.

FIG. 2B is a schematic drawing illustrating one embodiment of overlapping texel swaths 160a-c. In the depicted embodiment, three texel swaths 160a-c overlap. Any number of texel swaths 160 may be employed. As shown, two or more pluralities of lidar points 140 overlap each texel swath 160.

Figure 2C:
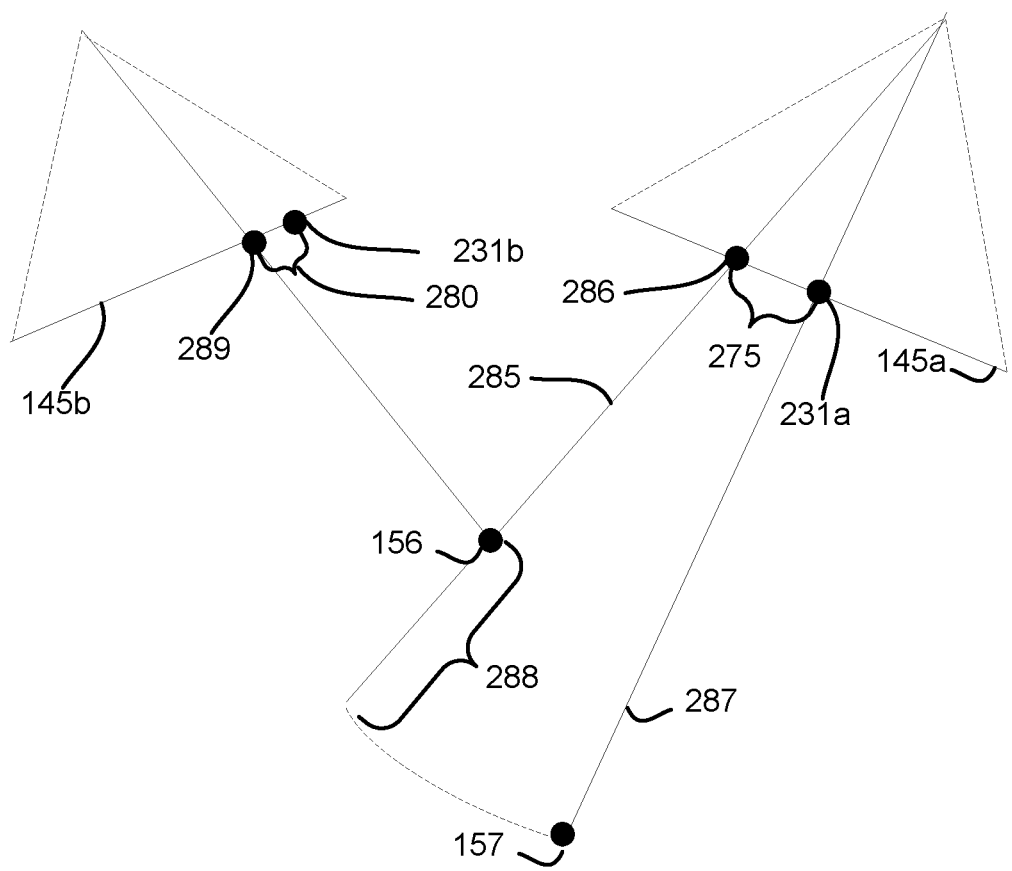
FIG. 2C is a schematic drawing illustrating one embodiment of identifying misregistration errors.

FIG. 2C is a schematic drawing illustrating one embodiment of identifying misregistration errors. A lidar point 140 is captured concurrently with a first optical image 145a in the first texel swath 160 at first coordinates $X_{ij_x}$, $X_{ij_y}$, $X_{ij_z}$ 157. The lidar point 140 is also in a field of view of a second optical image 145b in a second texel swath 160. The range of the lidar point 140 is not measured for the second optical image 145b. To calculate enhanced lidar coordinates for the original lidar point 140, the original lidar point 140 may be transformed from the first coordinates 157 to new lidar coordinates 156. First matching normalized projection coordinates 231a of the first coordinates 157 in the first optical image 145a correlates with second matching normalized projection coordinates 231b of the lidar coordinates 157 in the second optical image 145b. The normalized point projections $x_{ij}$, $y_{ij}$ 286/289 may be calculated using Equation 1 from the new lidar coordinates $X_{ij_x}$, $X_{ij_y}$, $X_{ij_z}$ 156 in the respective capture coordinates spaces of the first or second texel swaths 160, wherein the first point normalized projection 286 is a projection of the new lidar coordinates 156 in the first optical image 145a and the second normalized point projection 289 is a projection of the new lidar coordinates 156 into the second optical image 145b.

$$\begin{bmatrix} x_{ij} \\ y_{ij} \end{bmatrix} = \begin{bmatrix} \dfrac{X_{ij_x}}{X_{ij_z}} \\ \dfrac{X_{ij_y}}{X_{ij_z}} \end{bmatrix} \qquad \text{Equation 1}$$

The misregistration errors include a range error 288, a calibrated projection error 275, and a matching projection error 280. The range error 288 may be a difference of distances between a first vector 287 to the first lidar coordinate 157 and a second vector 285 to the new lidar coordinates 156. The first vector 287 may be the measured range 290. The calibrated projection error 275 may be a distance on a normalize image plane between the first matching normalized projection coordinate 231a and the first normalized point projection 286. The matching projection error 280 may be a distance from the second normalized point projection 289 to the second matching normalized projection coordinate 231b. In one embodiment, the vectors 285/287 may be calculated using Equation 2.

$$\lambda_{ij} = \sqrt{X_{ij_x}^2 + X_{ij_y}^2 + X_{ij_z}^2} \qquad \text{Equation 2}$$

Figure 2D:
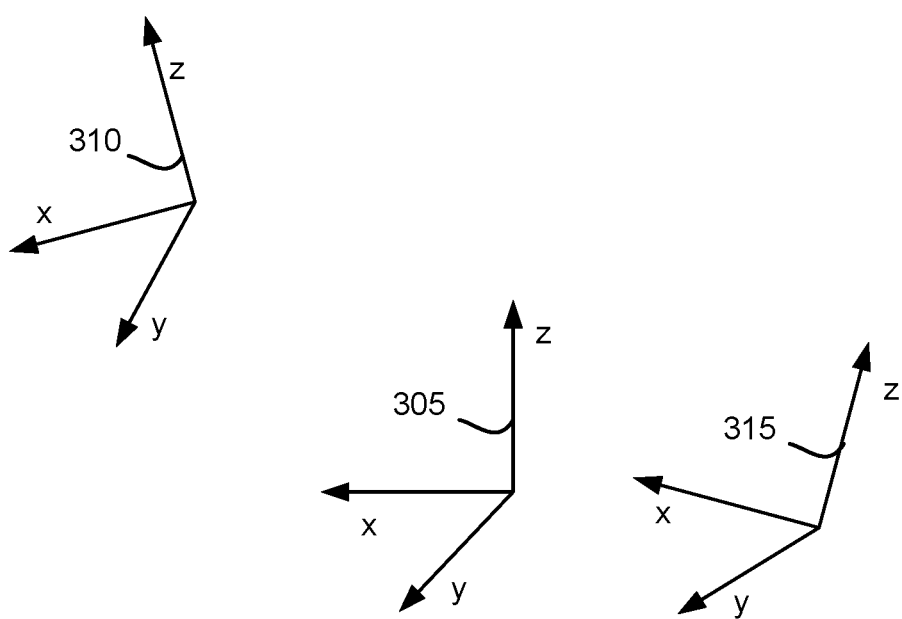
FIG. 2D is a drawing illustrating one embodiment of coordinate spaces.

FIG. 2D is a drawing illustrating one embodiment of coordinate spaces.

The coordinate spaces include a terrain coordinate space 305, a capture coordinate space 310, and an output coordinate space 315. The terrain coordinate space 305 may be coordinate space for the terrain 120. The capture coordinate space 310 may be the coordinate space in which the optical image 145 and the lidar points 140 are captured. The output coordinate space 315 may be the coordinate space of a textured digital elevation model. Each of the coordinate spaces 305/310/315 may be independent and may be related by one or more transformations.

Figure 3A:
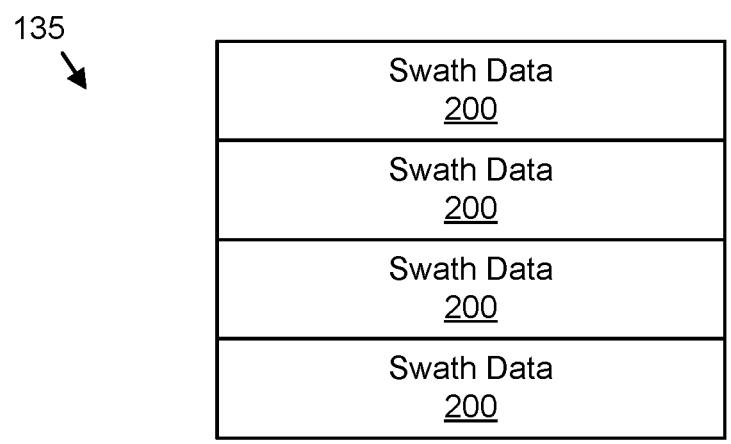
FIG. 3A is a schematic block diagram illustrating one embodiment of a swath database.

FIG. 3A is a schematic block diagram illustrating one embodiment of the swath database 135. The swath database 135 may be organized as a data structure in a memory. In the depicted embodiment, the swath database 135 includes a plurality of instances of swath data 200.

Figure 3B:
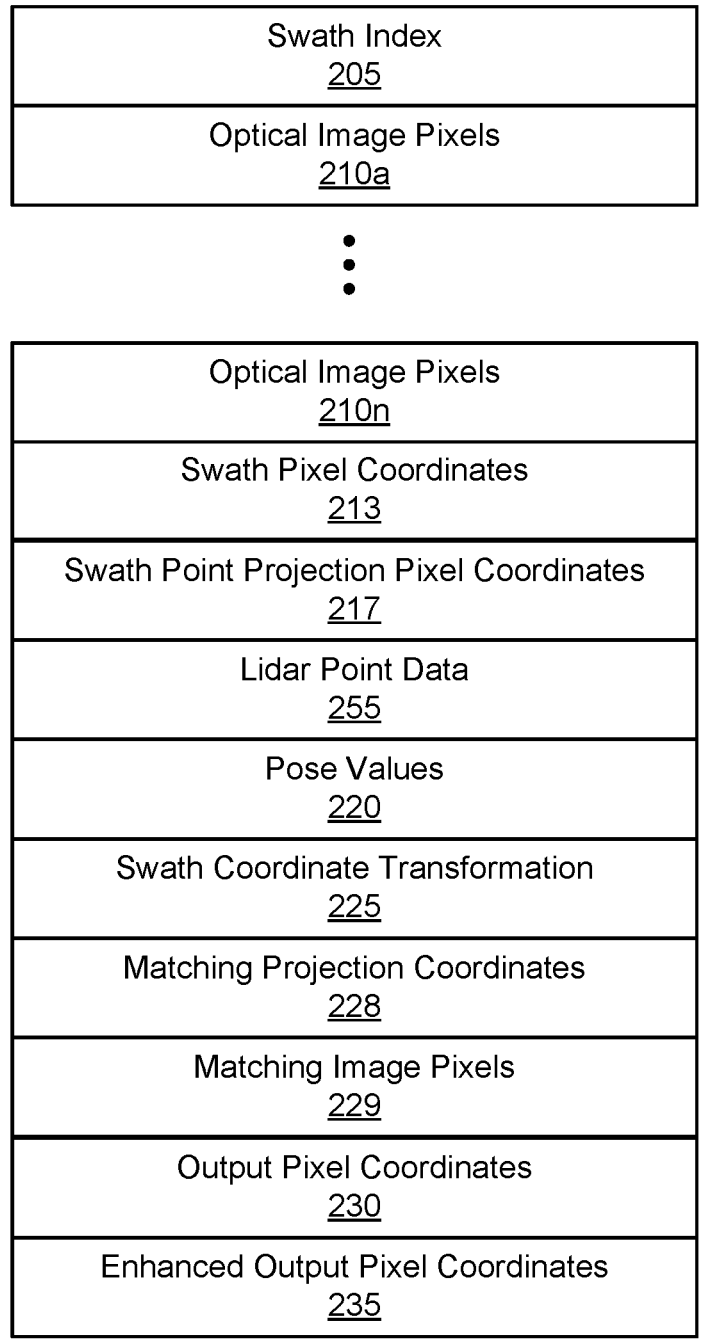
FIG. 3B is a schematic block diagram illustrating one embodiment of swath data.

FIG. 3B is a schematic block diagram illustrating one embodiment of the swath data 200. In the depicted embodiment, the swath data 200 includes a swath index 205, optical image pixels 210 for one or more optical images 145, swath pixel coordinates 213, swath point projection pixel coordinates 217, lidar point data 255, pose values 220, a swath coordinate transformation 225, matching projection coordinates 228, matching image pixels 229, output pixel coordinates 230, and enhanced output pixel coordinates 235.

The swath index 205 may uniquely identify the swath 160. The optical image pixels 210 may store the original image pixels 165 of the optical image 145. The swath pixel coordinates 213 may record the two dimensional (2D) coordinates of the optical image pixels 210 in the capture coordinate space 310. The swath point projection pixel coordinates 217 may be 2D pixel coordinates of a swath point projection. The swath data 200 may include multiple instances of lidar point data 255. The lidar point data 255 is described in more detail in FIG. 3C.

The pose values 220 may record a position and/or attitude of the lidar sensor 105 and the optical sensors 110 while capturing the texel swath 160. In one embodiment, the attitude and position of a pose value $a_j$ 220 for a given lidar sensor j 105 and/or optical sensor j 110 is represented as a vector comprising a quaternion describing the attitude $q_{j0}$, $q_{j1}$, $q_{j2}$, $q_{j3}$ concatenated with coordinates of the position $t_{jx}$, $t_{jy}$, $t_{jz}$, as shown in Equation 3.

$$a_j = [q_{j0}, q_{j1}, q_{j2}, q_{j3}, t_{jx}, t_{jy}, t_{jz}]^T \qquad \text{Equation 3}$$

The output pixel coordinates 230 may be the 2D pixel coordinates for the lidar point 140 in the output coordinate space 315. The swath coordinate transformation 225 may transform the swath pixel coordinates 213 for a lidar point 140 or an image pixel 165 into corresponding 2D output pixel coordinates 230 in the output coordinate space 315. The matching projection coordinates 228 may be 2D coordinates of a matching optical image pixel 210 on a normalized image plane of a swath 160. The matching image pixels 229 may be image pixels 165 in the optical image pixels 210 of a texel swath 160 that match optical image pixels 210 in an adjacent swath 160. The output pixel coordinates 230 may be enhanced as the enhanced output pixel coordinates 235. The enhanced output pixel coordinates 235 may be based on enhanced lidar coordinates for one or more lidar points 140 as will be described hereafter. The enhanced output pixel coordinates 235 may be used to generate the textured digital elevation model.

FIG. 3C is a schematic block diagram illustrating one embodiment of the lidar point data 255. In the depicted embodiment, the lidar point data 255 includes a lidar point index 465, lidar point coordinates 455, swath point projection coordinates 453, swath output point projection coordinates 457, swath pixel coordinates 460, output point projection coordinates 462, output lidar point coordinates 463, enhanced lidar coordinates 270, enhanced output point projection coordinates 472, the normalized projection coordinates 155, calibrated projection coordinates 159, the calibrated projection error 275, the matching projection error 280, and the range error 288. In a certain embodiment, the lidar point data 255 includes a range measurement 290. The range measurement 290 may only be stored if available.

The lidar point index 465 may uniquely identify the lidar point 140. The lidar point coordinates 455 may be the original three dimensional (3D) coordinates recorded by the lidar sensor 110 in the capture coordinate space 310. The swath point projection coordinates 453 may be 2D projection coordinates of the lidar point 140 into a swath 160. The swath output point projection coordinates 457 may be 2D coordinates of the lidar point coordinates 455 transformed into the output coordinate space 315. The swath pixel coordinates 460 may be the corresponding 2D swath pixel coordinates 213 for the lidar point coordinates 455 for a given texel swath 160. The output lidar point coordinates may be 3D point coordinates of the lidar point 140 when output into the output coordinate space 315. The output point projection coordinates 462 may be a 2D projection of output lidar point coordinates 463 into an output image in the output coordinate space 315.

The enhanced lidar coordinates 270 may be coordinates for the lidar point 140 in the output coordinate space 315. The output point projection pixel coordinates 462 may be coordinates of the output lidar point coordinates 463 projected into the output image. The normalized projection coordinates 155 may be 2D coordinates of a projection of a lidar point 140 into a normalized image plane of a texel swath 160. The calibrated projected coordinates 159 may be 2D coordinates of a projection of transformed lidar point 140 into a normalized image plane of a texel swath 160.

The determination of the calibrated projection error 275, matching projection error 280, and range error 288 is shown in FIG. 2C. The range measurement 290 may be captured as part of capturing the lidar point 140.

Figure 3D:
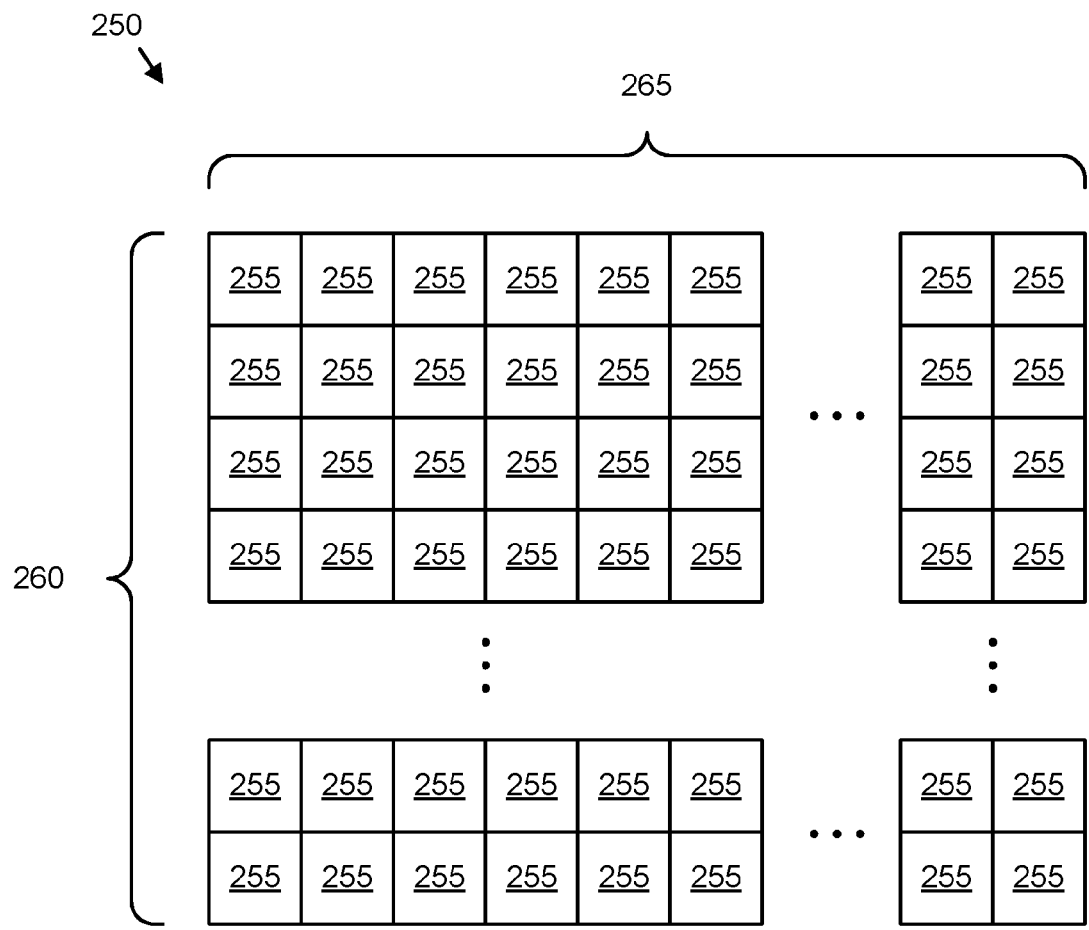
FIG. 3D is a schematic block diagram illustrating one embodiment of a projection matrix.

FIG. 3D is a schematic block diagram illustrating one embodiment of a projection matrix 250. The projection matrix 250 may organize the plurality of lidar point data 255. The projection matrix 250 may be organized as a data structure in a memory. In the depicted embodiment, the projection matrix 250 includes lidar point data rows 260, wherein each lidar point data row 260 includes the lidar point data 255 for a given lidar point 140 in each texel swath 160. The projection matrix 250 further includes swath columns 265, wherein each swath column 265 includes all potential lidar point data 255 in a given texel swath 160. As each texel swath 160 does not include all lidar points 140, the projection matrix 250 may be organized as a banded sparse matrix. The organization of the projection matrix 250 allows the enhanced lidar coordinates 270 to be calculated more efficiently by organizing the lidar point data 255 separately from the swath data 200 and in the sparse matrix for efficient calculation.

Figure 3E:
FIG. 3E is a schematic block diagram illustrating one embodiment of textured digital elevation model.

FIG. 3E is a schematic block diagram illustrating one embodiment of the textured digital elevation model 425. The textured digital elevation model 425 may represent the terrain 120. The textured digital elevation module 425 may be organized as a data structure in a memory. In the depicted embodiment, the textured digital elevation module 425 includes a plurality of output pixels 430. Each output pixel 430 may correspond to one or more image pixels 165 of at least one texel swath 160.

Figure 3F:
FIG. 3F is a schematic block diagram illustrating one embodiment of pixel data.
Figure 3F:
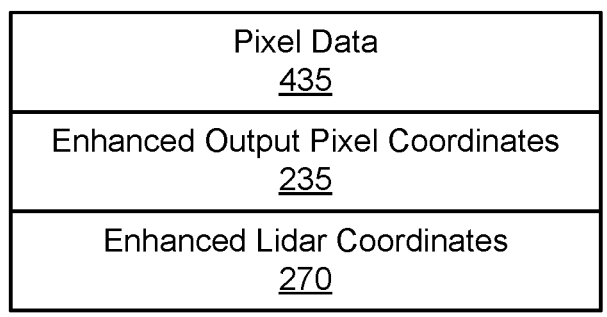

FIG. 3F is a schematic block diagram illustrating one embodiment of the output pixel 430. The output pixel 430 may be used to render a pixel of the textured digital elevation module 425. In the depicted embodiment, the output pixel 430 includes pixel data 435 for an image pixel 165 of the optical image pixels 210 and the corresponding enhanced output pixel coordinates 235. In addition, the output pixel 430 includes the corresponding enhanced lidar coordinates 270. The organization of the pixel data 435, the enhanced output pixel coordinates 235, and the enhanced lidar coordinates 270 supports efficient calculation of the textured digital elevation model 425.

Figure 4:
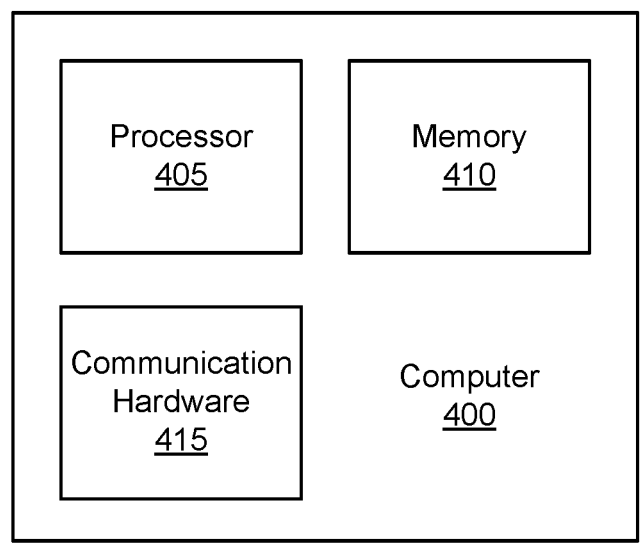
FIG. 4 is a schematic block diagram illustrating one embodiment of a computer.

FIG. 4 is a schematic block diagram illustrating one embodiment of a computer 400. In the depicted embodiment, the computer 400 includes a processor 405, a memory 410, and communication hardware 415. The memory 410 may a semiconductor storage device, a hard disk drive, a holographic storage device, a micromechanical storage device, or combinations thereof. The memory 410 may store code. The processor 405 may execute the code. The communication hardware 415 may communicate with other devices.

Figure 5A:
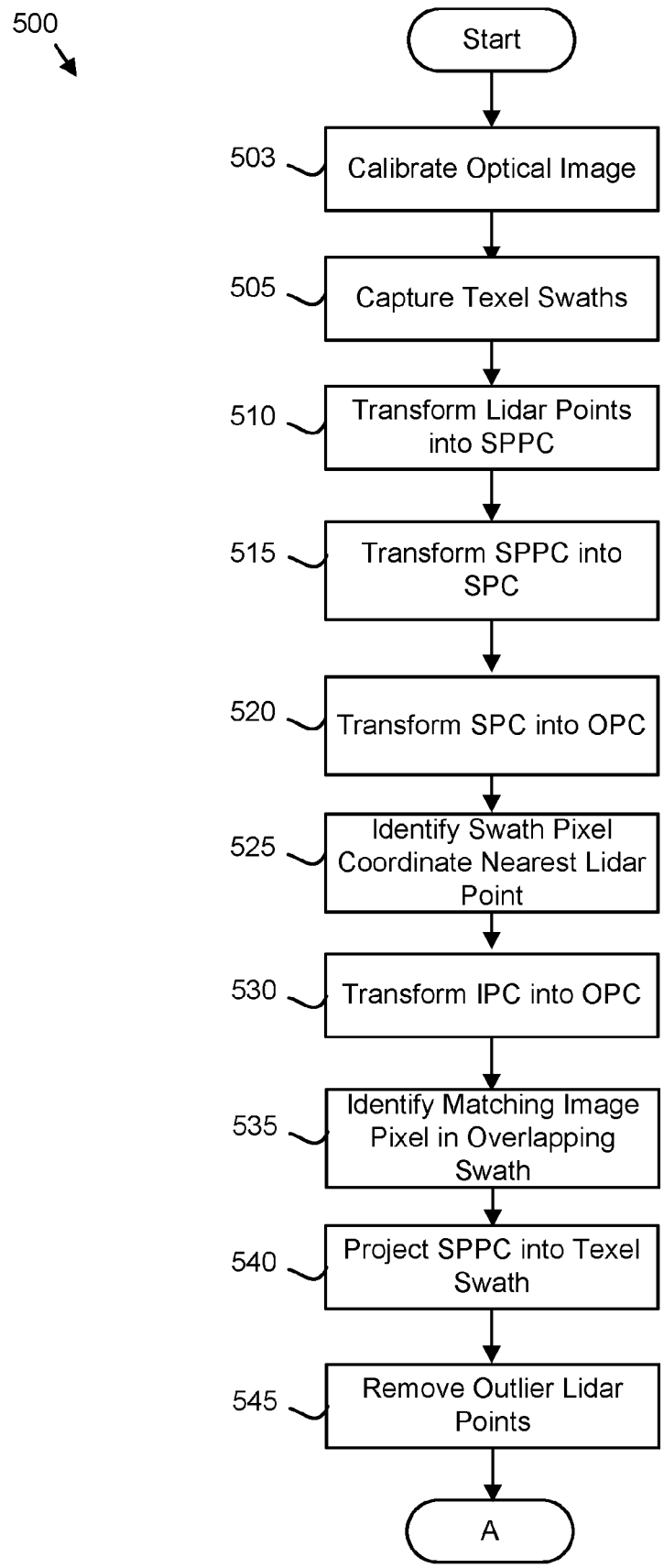
FIGS. 5A-B are schematic block diagrams illustrating one embodiment of a textured digital elevation model generation method.
Figure 5B:
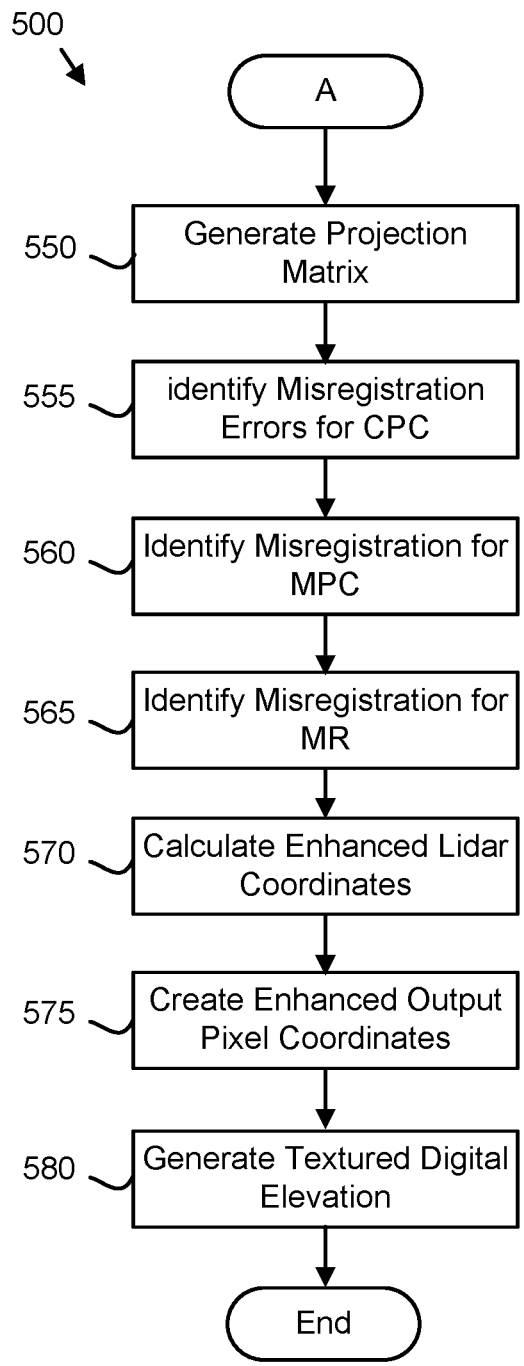

FIGS. 5A-B are schematic block diagrams illustrating one embodiment of a textured digital elevation model generation method 500. The method 500 generates a textured digital elevation model 425. The method 500 may be performed by the system 100, the computer 400, and/or the processor 405.

The method 500 starts, and in one embodiment, the system 100 calibrates 503 the optical image 145 captured by the optical sensor 110. The calibration may remove lens distortion at one or more image pixels 165.

In one embodiment, the system 100 captures 505 two or more texel swaths 160. Each texel swath 160 may comprise lidar points 140, an optical image 145, and/or swath output projection point coordinates 457 of the lidar points 140 into the optical image 145. The optical sensor 110 may capture 505 the optical image 145 and store the optical image 145 as swath data 200. In addition, the lidar sensor 105 may capture 505 the lidar points 140 and store the lidar points 140 to the swath database 135 as corresponding lidar point data 255 in the swath data 200. The texel swaths 160 may be captured 505 in the capture coordinate space 310.

The processor 405 may transform 510 the lidar point coordinates 455 of each lidar point 140 from the texel swaths 160 into the swath output point projection coordinates SPPC 457 of the output coordinate space 315. The lidar point coordinates LPPC 455 may be transformed as shown in Equation 4, where $M_A$ is a transformation matrix.

$$SPPC = M_A LPPC \qquad \text{Equation 4}$$

One embodiment of $M_A$ is shown in Equation 5.

$$M_A = \begin{bmatrix} 1 - \dfrac{2(q_{j_2}^2 + q_{j_3}^2)}{q_{j_0}^2 + q_{j_1}^2 + q_{j_3}^2 + q_{j_3}^2} & \dfrac{2(q_{j_1}q_{j_2} - q_{j_0}q_{j_3})}{q_{j_0}^2 + q_{j_1}^2 + q_{j_3}^2 + q_{j_3}^2} & \dfrac{2(q_{j_1}q_{j_3} + q_{j_0}q_{j_2})}{q_{j_0}^2 + q_{j_1}^2 + q_{j_3}^2 + q_{j_3}^2} & t_{jx} \\ \dfrac{2(q_{j_1}q_{j_2} + q_{j_0}q_{j_3})}{q_{j_0}^2 + q_{j_1}^2 + q_{j_3}^2 + q_{j_3}^2} & 1 - \dfrac{2(q_{j_1}^2 + q_{j_3}^2)}{q_{j_0}^2 + q_{j_1}^2 + q_{j_3}^2 + q_{j_3}^2} & \dfrac{2(q_{j_3}q_{j_3} - q_{j_0}q_{j_1})}{q_{j_0}^2 + q_{j_1}^2 + q_{j_3}^2 + q_{j_3}^2} & t_{jy} \\ \dfrac{2(q_{j_1}q_{j_3} - q_{j_0}q_{j_2})}{q_{j_0}^2 + q_{j_1}^2 + q_{j_3}^2 + q_{j_3}^2} & \dfrac{2(q_{j_2}q_{j_3} + q_{j_0}q_{j_1})}{q_{j_0}^2 + q_{j_1}^2 + q_{j_3}^2 + q_{j_3}^2} & 1 - \dfrac{2(q_{j_2}^2 + q_{j_1}^2)}{q_{j_0}^2 + q_{j_1}^2 + q_{j_2}^2 + q_{j_3}^2} & t_{jz} \\ 0 & 0 & 0 & 1 \end{bmatrix} \qquad \text{Equation 5}$$

The processor 405 may further transform 515 the swath output point projection coordinates 457 of each lidar point 140 of a texel swath 160 into the swath point projection coordinates 453 of the texel swath 160. In one embodiment, the swath output point projection coordinates SPPC 457 are transformed 515 into swath point projection coordinates SPC 453 using Equation 6, where $M_B$ is a transformation matrix employing either axial or rotational coordinates.

$$SPC = M_B SPPC \qquad \text{Equation 6}$$

The processor 405 may transform 520 the swath pixel coordinates 460 of each lidar point 140 into output pixel coordinates OPC 230 of a base texel swath 160. The base texel swath 160 may be selected from the plurality of texel swaths 160. The output coordinate space 315 may be the coordinate space of the base texel swath 160. The swath pixel coordinates 460 may be transformed 520 using the swath coordinate transformation $M_{SCT}$ 225 for the texel swath 160 of the lidar point 140 as shown in Equation 7.

$$OPC = M_{SCT} SPC \qquad \text{Equation 7}$$

The processor 405 may identify 525 a swath pixel coordinate that is nearest to a projection of a given lidar point 140 in an associated optical image 145. In one embodiment, the processor 405 employs a minimum distance algorithm to identify 525 the image pixel 165.

The processor 405 may transform 530 the swath pixel coordinates IPC 213 of the identified given image pixel 165 into the output pixel coordinates 230 using the swath coordinate transformation $M_{SCT}$ 225 as shown in Equation 8.

$$OPC = M_{SCT} IPC \qquad \text{Equation 8}$$

The processor 405 may identify 535 a matching image pixel 229 in each overlapping texel swath 160. The matching image pixel 229 may have the swath output point projection pixel coordinates 457 of the given lidar point 140.

The processor 405 may project 540 the swath point projection coordinates 253 of each lidar point 140 into the texel swatch 160 with normalized projection coordinates. The output pixel coordinates 230 may be transformed 540 using Equation 1.

The processor 405 may remove 545 one or more outlier lidar points 140. The outlier lidar points 140 may be outside of the terrain 124 the textured digital elevation model 425.

The processor 405 may generate 550 the projection matrix 450. The projection matrix 450 may include the lidar point data 255 for each lidar point 140 of each texel swath 160. The lidar point data 255 may include the normalized projection coordinates 155. In addition, the lidar point data 255 may include the range measurement 290 if the range measurement 290 is available for the lidar point 140.

The processor 405 may identify 555 misregistration errors between the normalized projection coordinates 155 and calibrated projection coordinates 159 as the calibrated projection error 275. In one embodiment, the normalized projection coordinates 155 are for the first normalized point projection 286. The calibrated projection coordinates 159 may be for the first matching normalized projection coordinate 231a.

The processor 405 may identify 560 misregistration between the normalized projection coordinates 155 and matching projection coordinates 228 as the matching projection error 280. The normalized projection coordinates 155 may be the second normalized point projection 289. The matching projection error 280 may be the second matching normalized projection coordinate 231b.

The processor 405 may identify 565 misregistration between the range measurement 290 and a range computed from transformed lidar point coordinates as the range error 288. The range may be computed from transformed lidar point coordinates may be the second vector 285.

The processor 405 may further calculate 570 the enhanced lidar coordinates 270 for each lidar point 140 as a function of minimizing the misregistration errors 275/280/288. In one embodiment, the misregistration errors 275/280/288 are minimized using a least-squares cost function. In a certain embodiment, the cost function $\varepsilon^2$ is calculated as shown in Equation 9, wherein M is a number of texel swaths, I is a set of lidar points, j is a swath index, i is a lidar point within a jth swath, $\lambda_{ij}$ is a measured range to the first lidar point ij, $\hat{\lambda}_{ij}$ is an adjusted range to enhanced lidar coordinates for the first lidar point ij, $x_{ij}$ is a first matching projection coordinate of the first lidar point ij, $y_{ij}$ is a second matching projection coordinate of the first lidar point ij, $\hat{x}_{ij}$ is a first normalized projection coordinate of the first lidar point ij, $\hat{y}_{ij}$ is a second normalize coordinate of the first lidar point ij, $\sigma_I^2$ is a variance of the first rotational error, $\sigma_J^2$ is a variance of the second rotational error, and $\sigma_\lambda^2$ is variance of the distance error.

$$\varepsilon^2 = \sum_{j=0}^{M-1} \sum_{i \notin I_j} \frac{1}{\sigma_I^2} [(x_{ij} - \hat{x}_{ij})^2 + (y_{ij} - \hat{y}_{ij})^2] +$$

$$\sum_{j=0}^{M-1} \sum_{i \notin I_j} \frac{1}{\sigma_J^2} [(x_{ij} - \hat{x}_{ij})^2 + (y_{ij} - \hat{y}_{ij})^2] +$$

$$\sum_{j=0}^{M-1} \sum_{i \notin I_j} \frac{1}{\sigma_\lambda^2} [(\lambda_{ij} - \hat{\lambda}_{ij})^2]$$

Equation 9

The processor 405 may create 575 the enhanced output pixel coordinates 235 of each image pixel 165 based on the enhanced lidar coordinates 270 for the lidar points 140 and the associated output pixel coordinates 230. In one embodiment, the enhanced output pixel coordinates EOPC 235 are calculated using Equation 10, where $M_C$ is a transformation from the output pixel coordinates 230 to the enhanced lidar coordinates 270 for the lidar points 140

EOPC=$M_C$OPC   Equation 10

The processor 405 may generate 580 the textured digital elevation model 425 based on one or more of the enhanced output pixel coordinates 235 for each image pixel 165 and the enhanced lidar coordinates 270 and the method 500 ends. In addition, the textured digital elevation model 425 may be generated based on the enhanced output point projection coordinates 472. In one embodiment, each output pixel 430 includes the pixel data 435 presented at the enhanced output pixel coordinates 235. As a result, each output pixel 430 is more precisely presented, improving the quality of the textured digital elevation model 425.

The embodiments may use the lidar points 140 to generate the enhanced output pixel coordinates 235 and improve the placement of the output pixels 430 within the textured digital elevation model 425. As a result, the output pixels 430 more precisely render the terrain 120.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
projecting, by use of a processor, swath point projection coordinates of each lidar point of texel swaths into a corresponding texel swath with normalized projection coordinates, wherein each texel swath comprises lidar points, an optical image, and swath output projection point coordinates of the lidar points into the optical image;
generating a projection matrix comprising lidar point data for each lidar point of each texel swath, wherein the lidar point data comprises the normalized projection coordinates;
calculating enhanced lidar coordinates for each lidar point as a function of minimizing misregistration errors;
creating enhanced output pixel coordinates for each image pixel based on the enhanced lidar coordinates for the lidar points and the associated output pixel coordinates; and
generating a textured digital elevation model based on the enhanced output pixel coordinates for each image pixel, and the enhanced lidar coordinates.

2. The method of claim 1, the method further comprising:
capturing the texel swaths;
transforming lidar point coordinates of each lidar point from the texel swaths into swath output point projection coordinates of an output coordinate space;
transforming the swath output point projection coordinates of each lidar point of a given texel swath into swath pixel coordinates of the given texel swath;
transforming the swath pixel coordinates of each lidar point into output pixel coordinates of a base texel swath using a swath coordinate transformation for the texel swath of the lidar point;
identifying a swath pixel coordinate that is nearest to a projection of a given lidar point into an associated optical image;
transforming swath pixel coordinates of the given pixel into the output pixel coordinates using the swath coordinate transformation corresponding to the texel swath of the given lidar point; and
identifying matching image pixels in each overlapping texel swath with the swath output point projection pixel coordinates of the given lidar point.

3. The method of claim 1, the method further comprising:
identifying the misregistration errors between the normalized projection coordinates and calibrated projection coordinates;
identifying the misregistration between the normalized projection coordinates and matching projection coordinates; and
identifying misregistration between a range measurement and a range computed from transformed lidar point coordinates.

4. The method of claim 3, wherein the misregistration errors comprise a range error that is a difference of distances between a first vector to first coordinates of a given lidar point and a second vector to a new coordinates of the given lidar point, a calibrated projection error that is a distance on normalized image plane between first matching projection coordinates of the first coordinates in a first optical image captured concurrently with the first lidar point and a first point projection that is a projection of normalized projection coordinates in the first optical image, and a matching projection error that is a distance from second matching projection coordinates that are a projection of the normalized projection coordinates to a second optical image to a second pixel projection.

5. The method of claim 4, wherein the misregistration errors are minimized using a least-squares cost function.

6. The method of claim 5, wherein the cost function $\varepsilon^2$ is calculated $$\varepsilon^2 = \sum_{j=0}^{M-1} \sum_{i \in I_j} \frac{1}{\sigma_I^2} [(x_{ij} - \hat{x}_{ij})^2 + (y_{ij} - \hat{y}_{ij})^2] +$$

$$\sum_{j=0}^{M-1} \sum_{i \in I_j} \frac{1}{\sigma_I^2} [(x_{ij} - \hat{x}_{ij})^2 + (y_{ij} - \hat{y}_{ij})^2] + \sum_{j=0}^{M-1} \sum_{i \in I_j} \frac{1}{\sigma_\lambda^2} [(\lambda_{ij} - \hat{\lambda}_{ij})^2],$$

wherein M is a number of texel swaths, I is a set of lidar points, j is a swath index, i is a lidar point within a jth swath, $\lambda_{ij}$ is a measured range to the first lidar point ij, $\hat{\lambda}_{ij}$ is an adjusted range to enhanced lidar coordinates for the first lidar point ij, $x_{ij}$ is a first matching projection coordinate of the first lidar point ij, $y_{ij}$ is a second matching projection coordinate of the first lidar point ij, $\hat{x}_{ij}$ is a first normalized projection coordinate of the first lidar point ij, $\hat{y}_{ij}$ is a second normalized coordinate of the first lidar point ij, $\sigma_I^2$ is a variance of the first rotational error, $\sigma_I^2$ is s a variance of the second rotational error, and $\sigma_\lambda^2$ is variance of the distance error.

7. The method of claim 1, wherein each lidar point is fused to the corresponding optical image at a calibrated pixel location.

8. An apparatus comprising:
a processor;
a memory storing code executable by the processor to perform:
projecting swath point projection coordinates of each lidar point of texel swaths into a corresponding texel swath with normalized projection coordinates, wherein each texel swath comprises lidar points, an optical image, and swath output projection point coordinates of the lidar points into the optical image;
generating a projection matrix comprising lidar point data for each lidar point of each texel swath, wherein the lidar point data comprises the normalized projection coordinates;
calculating enhanced lidar coordinates for each lidar point as a function of minimizing misregistration errors;
creating enhanced output pixel coordinates for each image pixel based on the enhanced lidar coordinates for the lidar points and the associated output pixel coordinates; and
generating a textured digital elevation model based on the enhanced output pixel coordinates for each image pixel, and the enhanced lidar coordinates.

9. The apparatus of claim 8, the processor further performing:
capturing the texel swaths;
transforming lidar point coordinates of each lidar point from the texel swaths into swath output point projection coordinates of an output coordinate space;
transforming the swath output point projection coordinates of each lidar point of a given texel swath into swath pixel coordinates of the given texel swath;
transforming the swath pixel coordinates of each lidar point into output pixel coordinates of a base texel swath using a swath coordinate transformation for the texel swath of the lidar point;
identifying a swath pixel coordinate that is nearest to a projection of a given lidar point into an associated optical image;
transforming swath pixel coordinates of the given pixel into the output pixel coordinates using the swath coordinate transformation corresponding to the texel swath of the given lidar point; and
identifying matching image pixels in each overlapping texel swath with the swath output point projection pixel coordinates of the given lidar point.

10. The apparatus of claim 8, the processor further performing:
identifying the misregistration errors between the normalized projection coordinates and calibrated projection coordinates;
identifying the misregistration between the normalized projection coordinates and matching projection coordinates; and
identifying misregistration between a range measurement and a range computed from transformed lidar point coordinates.

11. The apparatus of claim 10, wherein the misregistration errors comprise a range error that is a difference of distances between a first vector to first coordinates of a given lidar point and a second vector to a new coordinates of the given lidar point, a calibrated projection error that is a distance on a normalized image plane between first matching projection coordinates of the first coordinates in a first optical image captured concurrently with the first lidar point and a first point projection that is a projection of normalized projection coordinates in the first optical image, and a matching projection error that is a distance from second matching projection coordinates that are a projection of the normalized projection coordinates to a second optical image to a second pixel projection.

12. The apparatus of claim 11, wherein the misregistration errors are minimized using a least-squares cost function.

13. The apparatus of claim 12, wherein the cost function $\varepsilon^2$ is calculated $$\varepsilon^2 = \sum_{j=0}^{M-1} \sum_{i \in I_j} \frac{1}{\sigma_I^2} [(x_{ij} - \hat{x}_{ij})^2 + (y_{ij} - \hat{y}_{ij})^2] +$$

$$\sum_{j=0}^{M-1} \sum_{i \in I_j} \frac{1}{\sigma_I^2} [(x_{ij} - \hat{x}_{ij})^2 + (y_{ij} - \hat{y}_{ij})^2] + \sum_{j=0}^{M-1} \sum_{i \in I_j} \frac{1}{\sigma_\lambda^2} [(\lambda_{ij} - \hat{\lambda}_{ij})^2],$$

wherein M is a number of texel swaths, I is a set of lidar points, j is a swath index, i is a lidar point within a jth swath, $\lambda_{ij}$ is a measured range to the first lidar point ij, $\hat{\lambda}_{ij}$ is an adjusted range to enhanced lidar coordinates for the first lidar point ij, $x_{ij}$ is a first matching projection coordinate of the first lidar point ij, $y_{ij}$ is a second matching projection coordinate of the first lidar point ij, $\hat{x}_{ij}$ is a first normalized projection coordinate of the first lidar point ij, $\hat{y}_{ij}$ is a second normalized coordinate of the first lidar point ij, $\sigma_I^2$ is a variance of the first rotational error, $\sigma_I^2$ is s a variance of the second rotational error, and $\sigma_\lambda^2$ is variance of the distance error.

14. The apparatus of claim 8, wherein each lidar point is fused to the corresponding optical image at a calibrated pixel location.

15. A program product comprising a non-transitory computer readable storage medium storing code that is executable by a processor to perform:
- projecting swath point projection coordinates of each lidar point of texel swaths into a corresponding texel swath with normalized projection coordinates, wherein each texel swath comprises lidar points, an optical image, and swath output projection point coordinates of the lidar points into the optical image;
- generating a projection matrix comprising lidar point data for each lidar point of each texel swath, wherein the lidar point data comprises the normalized projection coordinates;
- calculating enhanced lidar coordinates for each lidar point as a function of minimizing misregistration errors;
- creating enhanced output pixel coordinates for each image pixel based on the enhanced lidar coordinates for the lidar points and the associated output pixel coordinates; and
- generating a textured digital elevation model based on the enhanced output pixel coordinates for each image pixel, and the enhanced lidar coordinates.

16. The program product of claim 15, the processor further performing:
- capturing the texel swaths;
- transforming lidar point coordinates of each lidar point from the texel swaths into swath output point projection coordinates of an output coordinate space;
- transforming the swath output point projection coordinates of each lidar point of a given texel swath into swath pixel coordinates of the given texel swath;
- transforming the swath pixel coordinates of each lidar point into output pixel coordinates of a base texel swath using a swath coordinate transformation for the texel swath of the lidar point;
- identifying a swath pixel coordinate that is nearest to a projection of a given lidar point into an associated optical image;
- transforming swath pixel coordinates of the given pixel into the output pixel coordinates using the swath coordinate transformation corresponding to the texel swath of the given lidar point; and
- identifying matching image pixels in each overlapping texel swath with the swath output point projection pixel coordinates of the given lidar point.

17. The program product of claim 15, the processor further performing:
- identifying the misregistration errors between the normalized projection coordinates and calibrated projection coordinates;
- identifying the misregistration between the normalized projection coordinates and matching projection coordinates; and
- identifying misregistration between a range measurement and a range computed from transformed lidar point coordinates.

18. The program product of claim 17, wherein the misregistration errors comprise a range error that is a difference of distances between a first vector to first coordinates of a given lidar point and a second vector to a new coordinates of the given lidar point, a calibrated projection error that is a distance on a normalized image plane between first matching projection coordinates of the first coordinates in a first optical image captured concurrently with the first lidar point and a first point projection that is a projection of normalized projection coordinates in the first optical image, and a matching projection error that is a distance from second matching projection coordinates that are a projection of the normalized projection coordinates to a second optical image to a second pixel projection.

19. The program product of claim 18, wherein the misregistration errors are minimized using a least-squares cost function.

20. The program product of claim 19, wherein the cost function $\varepsilon^2$ is calculated $$\varepsilon^2 = \sum_{j=0}^{M-1} \sum_{i \notin I_j} \frac{1}{\sigma_I^2} [(x_{ij} - \hat{x}_{ij})^2 + (y_{ij} - \hat{y}_{ij})^2] + \sum_{j=0}^{M-1} \sum_{i \notin I_j} \frac{1}{\sigma_I^2} [(x_{ij} - \hat{x}_{ij})^2 + (y_{ij} - \hat{y}_{ij})^2] + \sum_{j=0}^{M-1} \sum_{i \notin I_j} \frac{1}{\sigma_\lambda^2} [(\lambda_{ij} - \hat{\lambda}_{ij})^2],$$

wherein M is a number of texel swaths, I is a set of lidar points, j is a swath index, i is a lidar point within a jth swath, $\lambda_{ij}$ is a measured range to the first lidar point ij, $\hat{\lambda}_{ij}$ is an adjusted range to enhanced lidar coordinates for the first lidar point ij, $x_{ij}$ is a first matching projection coordinate of the first lidar point ij, $y_{ij}$ is a second matching projection coordinate of the first lidar point ij, $\hat{x}_{ij}$ is a first normalized projection coordinate of the first lidar point ij, $\hat{y}_{ij}$ is a second normalized coordinate of the first lidar point ij, $\sigma_I^2$ is a variance of the first rotational error, $\sigma_I^2$ is a variance of the second rotational error, and $\sigma_\lambda^2$ is variance of the distance error.

* * * * *